United States Patent Office 3,335,206
Patented Aug. 8, 1967

3,335,206
PROCESS FOR THE PRODUCING OF SYNTHETIC LEATHERS AND SIMILAR SHAPED ARTICLES
Osamu Fukushima and Hiroshi Hayanami, Kurashiki, Japan, assignors to Kurashiki Rayon Company Limited, Kurashiki, Japan, a corporation of Japan
No Drawing. Filed July 6, 1964, Ser. No. 380,635
Claims priority, application Japan, July 10, 1963, 38/36,483, 38/36,485
11 Claims. (Cl. 264—6)

This invention relates to a process for the production of synthetic leathers and similar shaped articles characterized in that the hydrogen of the secondary amino group of a high molecular weight material having secondary amino groups is substituted therefor by various chemical reactions and one or more high molecular weight materials having different degrees of the above substitution are mixed to form fibers, or fibers are formed by the mixed spinning of said high molecular weight material with material having no secondary amino groups, or high molecular weight material having secondary amino groups is formed into fibers and thereafter the fibers are themselves chemically treated so as to produce fibers having different degrees of substitution, and then forming one or more of the above fibers into a three-dimensional net structure and treating the fibers thereof with a solvent having different degrees of solubility with respect to the difference in the degree of substitution of the high molecular weight material, whereby the fibers are adhered to each other.

The principal object of the invention is to provide soft and tough artificial leathers and similar shaped articles.

A large number of patents are directed to synthetic leather consisting of a three-dimensional net structure of fibers, in which the adhesion between the fibers is effected by use of adhesives in general. In such methods, it is difficult to apply a most suitable amount of adhesives uniformly to the fibers, and if the adhesive is present in excess it results in less soft product which is tough like hard paper, while an insufficient amount of adhesive results in diminished strength due to the insufficient adhesion between fibers.

After various studies on methods for adhering fibers without using any adhesive, the inventors have found that when the fibers of a structure are partially dissolved by a suitable solvent the remaining fibers are adhered by the dissolved high molecular weight substance itself to maintain the structure, the suitable selection of such dissolving condition resulting in a very soft, tenacious and homogeneous product.

After having studied various methods to satisfy the aforementioned condition, the inventors have found that the aforesaid object can be attained by chemically treating a high molecular weight material having secondary amino groups to substitute the hydrogen of the said secondary amino groups with a suitable substituent, resulting in the difference in the solubilities in accordance with the degree of substitution, and dissolving the substituted high molecular material by means of a solvent which can dissolve the highly substituted part to adhere the fibers to each other and further that the object of adhering the fibers can be attained by subjecting to a similar chemical treatment the mixed spun fibers consisting of a mixture of high molecular weight material having secondary amino groups and that having amino groups and that having no secondary amino groups. When the hydrogen of the secondary amino group forms a hydrogen bond, for example, in the case of polyamide, the substitution of this hydrogen by another substituent eliminates the hydrogen bond, resulting in amorphousness or lowering of the secondary transition temperature and therefore the high molecular weight material constituting the adhesive becomes soft and the shaped articles formed therefrom likewise become soft.

For example, when nylon-6 fiber is heated in formalin for 5 hours by use of caustic soda as a catalyst, only the surface of the fiber is methylolated. If the fiber is formed into a three-dimensional net structure and is impregnated with methanol or a methanol solution containing a salt which can not dissolve nylon, the methylolated nylon-6 is dissolved on its surface and adheres the fibers. The methylolated nylon-6 at the adhesion point is a rubber like material, so the product is soft, elastic and tenacious. Similarly, blended spun fibers consisting of 50 parts of nylon-6 and 50 parts of polyethylene are subjected to similar chemical treatment to adhere the contact points of fibers with methylolated nylon to provide soft and elastic shaped articles.

The chemical reaction for substituting the secondary amino group in this invention may be carried out in a polymer state, followed by spinning the polymer to form a fiber or may be carried out in a fibrous state. Furthermore, a mixed spinning of a high molecular weight material whose secondary amino group is not substituted and a high molecular weight material with substituted secondary amino group or two or more high molecular weight materials having different degrees of substitution may be mixed spun.

Two or more fibers having different degrees of substitution may be laminated as separate webs, or mixed to form a web or their mixture may be laminated.

Typical high molecular weight materials having secondary amino group suitable for the invention are a variety of polyamides such as nylon-6, nylon-66, nylon-7, polyamide of m- or p-xylylenediamine and adipic acid, various co-polycondensed polyamides of nylon-44 with nylon-610, polyurethane, polyurea and polypeptide.

Typical high molecular weight materials having no secondary amino group suitable for the invention are thermoplastic high molecular weight materials such as polyethylene, polypropylene, polystrene, polyester and polyoxymethylene.

The chemical reaction for substituting the hydrogen in the secondary amino group according to the invention means a reaction for changing the solubility of the high molecular weight materials having the secondary amino group, for example, methylolation, oxyethylation, polyoxyethylation, polyoxymethylation, alkoxymethylation, substituted alkoxymethylations, thiomethylolation and alkylthiomethylation.

The solvents which dissolve the substituted part but which do not dissolve the nonsubstituted part are alcohols such as methanol, ethanol, propanol; acetone, ether and other conventional solvents or those in which high molecular weight materials, pigments, fillers and salts are dispersed or dissolved and which are suitably selected according to the kind of chemical reaction employed.

The mixed spun fibers of the invention may be manufactured by a wet spinning process, dry spinning process or melt spinning process. In case of a melt spinning process, it may be carried out under conventional spinning conditions or by conditioning the ambient temperature beneath the nozzle so as to maintain optimum conditions for spinning.

The hollow portion or cavities of the leather-like shaped article of the invention may be filled with an initial condensate of urea, formalin or melamine, a low molecular weight material having polycondensability such as ethylene oxide, ethylene imine and silicon tetrachloride or a low molecular weight material such as a vinyl compound, for example, vinyl chloride, acrylonitrile, vinyl acetate, acrylic acid and methacrylic acid, the emulsions of the polymers or copolymers thereof as a low or high molecular weight material having polycondensability. After being filled, polymerization or condensation may be carried out by heat treatment, chemical treatment, high frequency wave treatment, irradiation treatment or the melt adhesion may be carried out, so as to strengthen the adhesion between the fibers of the synthetic leather.

The following examples illustrate the invention further in detail.

Example 1

1 part of paraformaldehyde, 2 parts of methanol and 0.001 part of caustic soda were added to 1 part of a 20% solution of nylon-6 in formic acid, heated at 60° C. for 2 hours and mixed with 20 parts of water made basic by means of ammonia to precipitate N-methoxymethylated nylon. 50 parts of the resulting N-methoxymethylated nylon-6 and 50 parts of nylon-6 were dissolved in a 30% solution of calcium chloride in methanol so that the concentration of the polymer might be 15% and spun into water to provide mixed spun fibers.

The fibers were crimped, cut and formed into a random web having a three-dimensional net structure by means of a random webber and needle punch. When the random web was impregnated with methanol, the methoxymethylated part was dissolved and adhered the fibers to give a soft leather-like article.

Example 2

2 parts of nylon-66 staple fibers (5 deniers) were added to a solution consisting of 80 parts of 30% formalin, 0.1 part of caustic soda, 1 part of sodium chloride, heated for 4 hours, washed with water, dried and formed into a random web in the same manner as in Example 1. On the other hand, nylon-66 (2 deniers) was heated for 6 hours under the same conditions, washed with water, dried and formed into a random web. When both random webs were laminated and impregnated with methanol, the web heated for 4 hours was not so strongly adhered, whilst the web heated for 6 hours dissolved out a large amount of the high molecular weight material to obtain a leather-like article composed of the fibers adhered tightly and strongly.

Example 3

2 parts of nylon-7 staple fibers (6 deniers) were added to a solution of 70 parts of liquid ethylene oxide in 30 parts of methanol, reacted at 90° C. for 15 hours in an autoclave, washed with water, dried, and formed into a random web in the same manner as in Example 1. When the resulting web was impregnated with a solution of 30% of calcium nitrate in ethanol, the oxyethylated part on the surface was dissolved and adhered the fibers. Then, the product was washed with water to remove the salt to obtain a soft leather-like article.

Example 4

A web of the polyoxyethylated nylon-7, produced similarly to that described in Example 3, was immersed in an aqueous emulsion of methyl acrylate, the polymer was adhered to the web so that the ratio of the polymer to the web might be 10%, dried and then impregnated with a solution of 20% of magnesium iodide in methanol to dissolve the oxyethylated part on the surface and to adhere the fibers. After washing with water to dissolve the salt, a soft leather-like article was obtained.

Example 5

40 parts of nylon-6 chips and 60 parts of polyethylene chips obtained by the low pressure process were melted and kneaded in a screw extruder having 40 mm. dia. and the mixture was extruded through a spinneret having 100 orifices each 0.25 mm. in dia., cooled by introducing air into the zone beneath the spinneret and wound up at a rate of 600 m./min.

The thus obtained fibers were subjected to cold stretching two times their original length, then were crimped and cut. Then the fibers were added to a solution containing 100 parts of 30% formalin, 0.1 part of caustic soda and 1 part of sodium chloride to make the bath ratio 50:1 and heated for 4 hours. The fibers thus treated were washed with water, dried and formed into a web having a three-dimensional net structure by means of a random webber and needle punch. The web was impregnated with methanol and heated at 60° C., then the methylolated part on the surface of the fibers was dissolved to adhere the fibers. A soft and tenacious leather-like shaped article was obtained.

Example 6

Blended spun fibers were manufactured from 50 parts of nylon-66 chips and 50 parts of polypropylene chips in the same manner as in Example 1. The fibers were added to a solution containing 50 parts of paraformaldehyde, 50 parts of methanol, 50 parts of water and 10 parts of oxalic acid to make the bath ratio 80:1, and reacted at 65° C. for 3 hours, then washed with water, dried and formed into a web having a three-dimensional net structure in the same manner as in Example 1. The web was impregnated with ethyl alcohol and heated to 70° C., thereby dissolving the methylolated part on the surface of the fibers to adhere the fibers. A soft and tenacious leather-like shaped article was obtained.

Example 7

Blended spun fibers were manufactured from 55 parts of nylon-6 and 45 parts of polystyrene chips in the same manner as in Example 1. The fibers were added to a mixed solution of 2 mols of liquid ethylene oxide and 1 mol of methanol so that the bath ratio might be 50:1 and heated at 100° C. for 12 hours in an autoclave. The resulting fibers were washed, dried and formed into a web having a three-dimensional net structure in the same manner as in Example 1. The web was impregnated with a solvent of methanol containing 30% of sodium iodide and heated to 50° C., thereby dissolving the polyoxyethylated portion on the surface of the fibers to adhere the fibers. The web thus treated was washed with water to remove the salt, and a soft shaped article was obtained.

Example 8

Blended fibers consisting of 70 parts of nylon-6 and 30 parts of polyethylene (2 deniers) were crimped to 10/inch, cut to 4 cm. length, then added to a solution containing 100 parts of 30% formalin, 0.1 part of caustic soda and 1 part of sodium chloride so that the bath ratio might be 50:1 and heated for 8 hours (A-fiber). On the other hand, the mixed fibers consisting of 40 parts of nylon-6 and 60 parts of polyethylene (8 deniers) were crimped to 10/inch, cut to 4 cm. length, then added to a solution containing 70 parts of 30% formalin, 0.1 part of caustic soda and 1 part of sodium chloride so that the bath raito might be 50:1 and heated for 4 hours (B-fiber). From the A-fiber a random web of 100 g./m.² was produced and from the B-fiber a random web of 400 g./m.² was produced. The random web of the A-fiber located upside and the random web of the B-fiber located underside were united together uniformly and worked by an needle punch from both sides to give a three-dimensional net structure. The resulting raw cloth was impregnated with methanol and heated at 60° C. to dissolve the methoxylated portion of the fibers and adhere partially the fibers.

In this case, the web on the upper side was dissolved for a large amount, formed a uniform and smooth surface and had the appearance, texture and touch similar to those of natural leather.

What we claim is:

1. A process for the preparation of shaped fibrous articles comprising treating a fibrous three-dimensional random net structure of individual fibers, said individual fibers being selected from the group consisting of homogeneous and uniformly heterogeneous synthetic fibers with respect to their polymeric composition, and mixtures thereof, at least a portion of the said individual fibers and the said three-dimensional random net structure formed therefrom being comprised of tertiary polyamide, with a liquid other than an aqueous solution of a member selected from the group consisting of chloral and chloral hydrate, which liquid is a solvent for the said tertiary polyamide and a relative non-solvent for the remaining polymer present, for such time as to effect a binding of the fibrous structure and thence eliminating the said tertiary polyamide solvent therefrom.

2. The process of claim 1, wherein at least a portion of the individual fibers of the said fibrous three-dimensional random net structure are comprised at least in part of a secondary polyamide.

3. The process of claim 2, wherein the secondary polyamide is selected from the group consisting of nylon-6, nylon-66, nylon-7, the polycondensation product of m-xylenediamine and adipic acid, the polycondensation product of p-xylenediamine and adipic acid and the copolycondensation product of nylon-44 with a member selected from the group consisting of nylon-610, polyurethane, polyurea and polypeptide.

4. The process of claim 1, wherein at least a portion of the individual fibers of the said fibrous three-dimensional random net structure are comprised at least in part of a member selected from the group consisting of polyethylene, polypropylene, polystyrene and polyoxymethylene.

5. The process of claim 1, wherein at least a portion of the individual fibers of the said fibrous three-dimensional random net structure are comprised at least in part of fiber-forming polyester, said polyester being insoluble in the liquid which is a solvent for the tertiary polyamide.

6. The process of claim 2, wherein at least a portion of the individual fibers of the said fibrous three-dimensional random net structure are comprised at least in part of a member selected from the group consisting of polyethylene, polypropylene, polystyrene and polyoxymethylene.

7. The process of claim 2, wherein at least a portion of the individual fibers of the said fibrous three-dimensional random net structure are comprised at least in part of fiber-forming polyester, said polyester being insoluble in the liquid which is a solvent for the tertiary polyamide.

8. The process of claim 1, wherein the solvent for the tertiary polyamide is selected from the group consisting of methanol, ethanol, propanol, acetone, ether and mixtures thereof with a salt selected from the group consisting of sodium nitrate, calcium nitrate, magnesium iodide and sodium iodide.

9. The process of claim 1, further including filling the cavities of the resulting bound fibrous structure with a polymerized member selected from the group consisting of an initial condensate of melamine, ethylene oxide, ethylene imine, silicon tetrachloride, vinyl chloride, acrylonitrile, vinyl acetate, acrylic acid, methacrylic acid, and mixtures thereof.

10. A process for the preparation of shaped fibrous articles comprising at least partially converting polymer comprised of secondary polyamide into polymer comprised of tertiary polyamide, the said conversion being effected via a member selected from the group consisting of methylolation, oxyethylation, polyoxyethylation, polyoxymethylation, alkoxymethylation, thiomethylolation and alkylthiomethylation, spinning the thus-formed polymer comprised of tertiary polyamide into fibers, forming a fibrous three-dimensional random net structure of individual fibers, said individual fibers being selected from the group consisting of homogeneous and uniformly heterogeneous synthetic fibers with respect to their polymeric composition, and mixtures thereof, and at least a portion of the said individual fibers and the said three-dimensional random net structure formed therefrom being comprised of the above thus-formed fibers comprised of tertiary polyamide, and thence treating the said three-dimensional random net structure in accordance with the process as defined by claim 1.

11. A process for the preparation of shaped fibrous articles comprising at least partially converting fibers comprised of secondary polyamide into fibers comprised of tertiary polyamide, the said conversion being effected via a member selected from the group consisting of methylolation, oxyethylation, polyoxyethylation, polyoxymethylation, alkoxymethylation, thiomethylolation and alkylthiomethylation, forming a fibrous three-dimensional random net structure of individual fibers, said individual fibers being selected from the group consisting of homogeneous and uniformly heterogeneous synthetic fibers with respect to their polymeric composition, and mixtures thereof, and at least a portion of the said individual fibers and the said three-dimensional random net structure formed therefrom being comprised of the above thus-formed fibers comprised of tertiary polyamide, and thence treating the said three-dimensional random net structure in accordance with the process as defined by claim 1.

References Cited

UNITED STATES PATENTS 3,010,858 11/1961 Sexsmith _____ 264—123
3,117,362 1/1964 Breen.

ROBERT F. WHITE, *Primary Examiner.*

ALEXANDER H. BRODMERKEL, *Examiner.*

J. R. HALL, *Assistant Examiner.*